United States Patent Office 3,137,667
Patented June 16, 1964

3,137,667
PROCESS FOR THE MANUFACTURE OF STABLE AQUEOUS RESIN EMULSIONS OF THE OIL-IN-WATER TYPE
Hans U. Gassmann, Basel, Luzius Schibler, Riehen, and Hans R. Zbinden, Basel, Switzerland, assignors to Ciba Limited, Basel, Switzerland
No Drawing. Filed Feb. 28, 1958, Ser. No. 718,127
Claims priority, application Switzerland Mar. 6, 1957
13 Claims. (Cl. 260—29.4)

Oil-in-water emulsions of water-insoluble hardenable carbamide resins are known and are used for various purposes, for example, as adhesives, binding agents, impregnating agents in the treatment of fibrous materials. Combinations of such carbamide resin emulsions with aqueous dispersions of homopolymers or copolymers have been found suitable especially for the fixation of pigments on fibrous materials, such as leather, paper and textiles. As water-insoluble hardenable carbamide resins there are used condensation products obtained from formaldehyde, a compound containing an amide group and capable of forming hardenable resins with formaldehyde, and an alcohol not substantially miscible with water. There are generally used for making the emulsions solutions of such condensation products in the alcohols used for the condensation, if desired, with the addition of a further solvent, for example, xylene. As emulsifying agents, which are capable of forming oil-in-water emulsions of the aforesaid kind, there are used, besides proteins, such as casein, preferably ion-free products such as are obtained by the reaction of more than four molecular proportions of ethylene oxide with one molecular proportion of a water-insoluble compound containing a hydrocarbon radical of high molecular weight and at least one active hydrogen atom.

It is known that considerable difficulty attends the production of stable aqueous emulsions of carbamide resins of the above kind. The reason for this is that the alcohol present in the carbamide lacquer resin impairs the formation of an emulsion, and in some cases, when the alcohol is present in considerable amount, even prevents the formation of an emulsion. In the finished preparations the alcohol, which is soluble both in the oily and in the aqueous phase, generally impairs stability to an excessive degree.

As "stable" aqueous emulsions there are to be understood for the purposes of the present invention emulsions which remain unchanged during long storage, that is to say, they maintain their dispersed condition. Stable emulsions can be stored at temperatures of 30–50° C. for a few weeks. Any changes that take place should be such as can be easily and completely eliminated by simple stirring. The stability of aqueous carbamide lacquer resin emulsions is especially important when they are to be mixed with other dispersed systems for example, pigment suspensions and/or polymer latices. In such combinations unstable emulsions easily tend to coagulate and precipitate out completely, and the other disperse phase or phases are also wholly or partially involved. On the other hand, stable systems, provided that the individual particles have the same charge, are not miscible in high concentrations without loss of their dispersed condition. However, insufficient stability is sometimes exhibited in disperse systems having two or more phase only under considerable mechanical stress, for example, during intense stirring or under the action of strong shearing forces, such as occur when these combinations of binding agents are worked on spreading machines or printing machines. Only when under these conditions no disturbances, such as coagulation or flocculation, occur can such products be said to have sufficient stability for practical purposes.

The present invention is based on the observation that stable aqueous resin emulsions of the oil-in-water type can be made by freeing substantially completely a resin lacquer comprising a (1) hardenable water-insoluble etherified methylol-compound of a substance of amide character capable of forming hardenable aminoplasts with formaldehyde and (2) an alcohol containing 3–7 carbon atoms which is of at least limited miscibility with water, from said alcohol by extraction with a liquid which leaves said etherified methylol-compound undissolved but possesses at least limited miscibility with the said alcohol, and then emulsifying in water the extracted etherified methylol-compound in the presence of an emulsifying agent.

As hardenable water-insoluble etherified methylol-compounds of the aforesaid kind there are used products which are obtained in known manner by the etherification of methylol-compounds of substances of amide character capable of forming hardenable aminoplasts with formaldehyde, such as guanidine, dicyandiamide, biuret, thiourea and especially urea, but also aminotriazines containing at least two primary amino groups capable of reacting with formaldehyde, such as benzoguanamine, acetoguanamine, formoguanamine and especially melamine, with alcohols containing 3–7 carbon atoms which are at least of limited miscibility with water, for example, propanol, amyl alcohol, hexyl alcohol, cyclohexanol, benzyl alcohol and especially n-butanol. Since an excess of such an alcohol is used for the etherification there is obtained directly a solution of the etherified methylol-compound in the alcohol of at least limited miscibility with water, that is to say, a resin lacquer which is used for the process of this invention. Accordingly, there is used in this process a solution of a hardenable water-insoluble etherified methylol-compound of a substance of amide character capable of forming hardenable aminoplasts with formaldehyde in which the oxygen atom of at least one methylol group is bound to the hydrocarbon radical of an alcohol containing 3–7 carbon atoms which is at least of limited miscibility with water.

As an extraction agent there may be used quite generally any liquid which does not dissolve the resin, that is to say, the aforesaid etherified methylol-compound, but possess at least limited miscibility with the aforesaid alcohol, for example, n-butanol. In the case of resins of the aforesaid kind that are insoluble in aliphatic hydrocarbons, benzine, for example, may be used as extraction agent. When the resin lacquer is stirred with such an extraction agent and the whole is allowed to stand for a little time in a quiescent state, two layers are formed of which the upper layer consists of benzine and a part of the solvent alcohol extracted from the resin lacquer, and the lower layer consists of the resin from which the alcohol has been extracted. It will be evident that by repeating this operation several times the resin can be substantially completely freed from the alcohol of the aforesaid kind.

In an analogous manner water can be used as the extraction agent, which is desirable for obvious reasons. Notwithstanding that most of the aforesaid alcohols, for example, n-butanol, are only of limited miscibility with water, it is possible to extract the solvent alcohol almost quantitatively with the use of large quantities of water. A part of the free formaldehyde that is always present is simultaneously extracted from the resin with the alcohol that is of at least limited miscibility with water.

Two different liquids that need not be miscible with one another, for example, benzine and water, may be used simultaneously for the extraction.

The extraction may be carried out in a continuous manner on the countercurrent principle, especially when water is used as extraction agent. When the alcohol to be extracted is only of limited miscibility with water, it is of advantage to carry out the extraction in such manner that the water being discharged is almost saturated with the alcohol of limited miscibility with water, and then the alcohol may be recovered and returned to the process.

An advantageous procedure is to mix the resin lacquer with water in a kneading apparatus, for example, a tippable double trough kneader (Werner and Pfleiderer system) for a short time and, after allowing the mixture to stand, to pour off the aqueous phase containing alcohol dissolved therein, and to repeat the treatment with water of the phase containing the resin. After repeating the treatment several times there is obtained a resin which is substantially completely free from the alcohol of the kind referred to above. In order to facilitate intimate mixing of the resin with the extraction agent and subsequent separation of the phases, the final stages of the extraction may be carried out at a raised temperature.

The resin freed from the solvent alcohol by extraction is a sticky more or less viscous thermoplastic mass depending on the degree of condensation reached during its manufacture. Resins having a low degree of condensation, which are of relatively low viscosity in the solvent-free condition, can usually be emulsified without the need for further precautions. In most cases, however, the resin should be mixed with a suitable solvent in order to facilitate emulsification. As solvents for this purpose organic liquids of all kinds may be used, which have a good solvent power for the resin, but are insoluble in water, for example, hydrocarbons such as lacquer benzine, petroleum fractions, toluene, xylene, decahydronaphthalene, halogenated hydrocarbons, such as carbon tetrachloride or monochlorobenzene, and also water-insoluble higher alcohols, such as n-octanol, higher ethers and ketones, or esters, for example, amyl acetate. Especially useful are high boiling esters, such as dioctyl phthalate or tricresyl phosphate, which are typical plasticisers for thermoplasts. They are advantageously used when the aqueous resin emulsion is to be mixed with an aqueous dispersion of a homopolymer or copolymer. When water is used as extraction agent, an organic solvent of the aforesaid kind may be added to the resin before or during the extraction or after the extraction.

There is no difficulty in emulsifying the resin or resin solution which has been freed from the alcohol of at least limited miscibility with water, and emulsification can generally be carried out with the usual emulsifying agents, for example, soaps, sulforicinoleates, fatty alcohol sulfonates or cation-active substances, for example, salts or quaternary compounds of amines of high molecular weight. Especially suitable emulsifying agents for use in the process are non-ionic ethylene oxide condensation products of water-insoluble organic compounds containing at least one reactive hydrogen atom, for example, ethylene oxide condensation products of fatty acids or fatty acid amines containing at least 8 carbon atoms, or of higher amines, such as oleyl amine, or mercaptans, and especially of alcohols containing at least 8 carbon atoms, such as octadecyl alcohol, oleyl alcohol or hydroabietyl alcohol, and also of phenols containing at least one alkyl group, for example, isohexyl-, octyl-, dodecyl- or octadecyl-phenol. There may also be mentioned, for example, reaction products of one molecular proportion of hydroabietyl alcohol with 100–200 molecular proportions of ethylene oxide, the reaction product of one molecular proportion of oleyl alcohol and 80 molecular proportions of ethylene oxide, and the reaction product of one molecular proportion of para-octyl-phenol and 25–30 molecular proportions of ethylene oxide. Especially suitable are also reaction products of polyisocyanates with ethylene oxide condensation products of compounds containing at least 8 carbon atoms and a reactive hydrogen atom, such as are obtained by the process of application Serial No. 603,164 filed August 9, 1956 by Hans U. Gassmann. There may be mentioned, for example, the product obtained by the additive combination of 200 molecular proportions of ethylene oxide with 1 molecular proportion of hydroabietyl alcohol followed by reaction of the addition product with 1% of hexamethylene-1:6-diisocyanate. Proteins, such as casein, and their reaction products with alkylene oxides, such as ethylene oxide or propylene oxide, protein-fatty acid condensation products and the like are also suitable as emulsifying agents.

Depending on the content of resin, organic solvent, emulsifying agent and water, there are obtained emulsions having a thinly liquid to salve-like consistency, which are characterized by their good to excellent stability and storage qualities. They constitute in themselves, or in combination with aqueous dispersion of homopolymers or copolymers, filling, matting or hydrophobic agents, water-soluble hardenable precondensates, for example, methylol compounds of urea or melamine, plasticisers, water-soluble thickening agents or aqueous emulsions of hydrocarbons, very valuable dressing or binding agents, which are especially suitable for fixing pigments on paper, leather or textiles by spreading, spraying, printing or dyeing methods.

The following examples illustrate the invention the parts and percentages being by weight unless otherwise stated:

*Example 1*

1000 parts of a solution in butyl alcohol of a melamine-formaldehyde condensation product etherified with *n*-butanol and which is soluble in benzine hydrocarbons, the said solution having a dry content of about 80%, are stirred well with 2000 parts of water at 20° C. for a few minutes.

Upon allowing the mixture to stand in a quiescent state the coarse emulsion rapidly separates into two layers, of which the lower consists mainly of resin solution, and the upper consists of water containing a part of the solvent butanol originally present in the resin. The aqueous layer is removed by cautious decantation.

These operations are repeated, namely stirring with water, allowing the emulsion to separate into layers, and decantation, six times with the use of 2000 parts of water each time, and the temperature of the water used being gradually raised towards 60° C. After the last decantation the characteristic intense odour of butanol almost completely disappears, and the remaining resin layer, which is at first relatively thinly liquid, solidifies on cooling to a viscous sticky mass, which has a milky turbid appearance due to the fine droplets of water dispersed therein. There is obtained a total of 970 parts of a resin mass having a water content of 11.5%.

680 parts of the above resin mass, corresponding to 600 parts of pure resin, are then heated to about 60° C. in order to reduce the viscosity of the mass, and are then emulsified in a solution of 60 parts of an emulsifying agent (obtained by the additive combination of 200 molecular proportions of ethylene oxide with 1 molecular proportion of hydroabietyl alcohol followed by reaction of the addition product with 1% of hexamethylene-1:6-diisocyanate) in 260 parts of water. By homogenizing the emulsion at a raised temperature there are obtained 1000 parts of a finely dispersed stable emulsion which contains 60% of pure resin and is suitable as a hardenable adhesive for paper, leather and textiles.

*Example 2*

452 parts of the etherified melamine-formaldehyde condensation product of Example 1, corresponding to 400 parts of anhydrous resin and which has been extracted with water as described in Example 1, are dissolved in 200 parts of heavy gasoline having a boiling range of 100–140° C. The thinly liquid resin solution is then emulsified in a solution of 40 parts of an addition product of 20 molecular proportions of ethylene oxide with one molecular proportion of castor oil in 208 parts of water, and the emulsion is finely homogenized. By dilution with a further 100 parts of water, there are obtained 1000 parts of a cream-like finely dispersed stable emulsion, which can be used as a hardenable adhesive in the same manner as the emulsion obtained as described in Example 1.

*Example 3*

1000 parts of a solution in butyl alcohol of a melamine-formaldehyde condensation product which is etherified with n-butanol and is insoluble in benzine hydrocarbons, the said solution having a dry content of about 75%, are intimately mixed in a kneading apparatus for a few minutes with 2000 parts of water. The mixture is then allowed to stand in a quiescent state for a few minutes, and, the greater part of the water is decanted from the resin mass by tipping the kneading apparatus. The water contains butanol that has been taken up from the resin. The kneading apparatus is again charged with cold water, and the aforesaid procedure is repeated a total of four times. The resin, which has thus been freed from the greater part of the solvent, forms a coherent viscous mass. The kneading apparatus is then closed by means of a tight fitting cover provided with an inlet connection and an outlet connection. Kneading is continued for 1–2 hours longer, during which the kneading apparatus is continuously rinsed with fresh water. In this manner the resin is freed from the last traces of butanol.

After removal of the last traces of rinsing water from the kneading apparatus, and the resin mass has been freed as far as possible from water by further kneading, there are obtained approximately 950 parts of a compact thermoplastic mass, which consists of about 750 parts of solvent-free resin and 200 parts of water.

252 parts of the aqueous resin mass resulting from the extraction are then dissolved in 300 parts of dioctyl phthalate, whereby a syrupy solution is obtained that is turbid due to the water present therein. The latter solution is emulsified in a solution of 50 parts of the emulsifying agent used in Example 1 in 398 parts of water, and the emulsion is finely homogenised towards the end. There are obtained 1000 parts of a stable viscous emulsion.

By mixing 100 parts of the resulting emulsion with 100 parts of an aqueous dispersion of 50% strength of a butadiene-styrene copolymer, 200 parts of water and 50 parts of an aqueous solution of 50% strength of a mixture of emulsifying agents consisting of 8 parts of the addition product of 100 molecular proportions of ethylene oxide with one molecular proportion of hydroabietyl alcohol and 3 parts of a condensation product prepared as described in Example 3 of application Serial No. 603,164 filed August 9, 1956 by Hans U. Gassmann, and emulsifying 550 parts of petroleum in the mixture, there is obtained an emulsion which is very suitable as a medium for pigment printing on textiles.

*Example 4*

1000 parts of a solution in butyl alcohol of a melamine-formaldehyde-condensation product etherified with n-butanol and insoluble in benzine hydrocarbons, the said solution having a dry content of about 75%, are mixed with 500 parts of dioctyl phthalate. The solution is treated 4 times in the manner described in Example 1 with 3000 parts of water on each occasion, the temperature of the water being gradually raised from 20° C. to 50° C. After the final decantation, there are obtained 1400 parts of a viscous resinous mass, which still flows easily in the cold and contains about 135 parts of water in the form of uniformly dispersed fine droplets.

663 parts of the resulting resin solution (corresponding to 600 parts of water-free solution) are emulsified in a solution of 50 parts of the emulsifying agent used in Example 1 in 287 parts of water, and the whole is finely dispersed in a homogeniser. There is obtained a stable viscous emulsion.

400 parts of the resulting emulsion are mixed with 600 parts of a dispersion, which has been prepared by dispersing 192 parts of carbon black in a solution of 128 parts of the addition product of 80 molecular proportions of ethylene oxide with 1 molecular proportion of commercial oleyl alcohol in 280 parts of water. In this manner there are obtained 1000 parts of a pigment preparation which is stable and has good storage qualities.

By mixing, for example, 150 parts of the resulting preparation with 800 parts of the emulsion containing 55% of petroleum and described at the end of Example 3, 30 parts of water and 20 parts of an aqueous solution of 50% strength of ammonium nitrate, there is obtained a paste which can be applied to textiles by the usual methods by means of a stencil or rollers. There is obtained a deep black print, which, after being dried at about 20–70° C. and subsequently subjected to a dry heat treatment at 130–150° C. for 5 minutes, is fixed fast to rubbing and washing.

*Example 5*

1000 parts of a solution of about 60% strength in cyclohexanol of a condensation product, which has been obtained by reacting crystallized dimethylol-urea dimethyl ether with cyclohexanol, are treated in the manner described in Example 1 10 times with 2000 parts of water at 80° C. each time until the characteristic odour of cyclohexanol has almost disappeared. There are obtained 740 parts of turbid viscous resinous mass, which contains 20% of water suspended therein in the form of drops.

500 parts of the product of the above extraction are dissolved in 200 parts of pine oil, and the syrupy solution is then emulsified in a solution of 80 parts of the addition product of 25 molecular proportions of ethylene oxide with one molecular proportion of para-octyl-phenol in 220 parts of water. There are obtained 1000 parts of a finely dispersed stable emulsion, which can be used as an adhesive or pigment binding agent.

*Example 6*

100 parts of a solution in butyl alcohol of a urea-formaldehyde condensation product etherified with n-butanol, the said solution being of about 75% strength, are mixed with 100 parts of metaxylene. The syrupy solution is treated in the manner described in Example 1 6 times with 2000 parts of water each time, during which the temperature of the water is gradually raised from 20° C. to 60° C. There are finally obtained 1050 parts of a highly viscous resinous syrup, which contains 20% of water in the form of finely dispersed drops.

354 parts of the product of the above extraction are dissolved in 286 parts of monochlorobenzene. The resulting thinly liquid turbid syrup is emulsified in a solution of 57 parts of the product (obtained by the additive combination of 25 molecular proportions of ethylene oxide with 1 molecular proportion of octadecylamine followed by quaternation with dimethyl sulfate) in 303 parts of water. There are obtained 1000 parts of a stable emulsion, which contains about 28% of the pure condensation product and 32% of the solvent.

500 parts of the resulting emulsion are mixed with 500 parts of a cation-active emulsion of 40% strength of a copolymer of n-butyl acrylate and vinyl acetate prepared in the presence of a quaternary acrylamide compound. There are obtained 1000 parts of a thinly liquid stable emulsion of typical cation-active character.

*Example 7*

624 parts of the butanol-free extract (corresponding to 500 parts of pure anhydrous resin) obtained as described in the first paragraph of Example 3 are mixed with 50 parts of meta-xylene and 50 parts of white spirit, whereby a syrupy turbid solution is obtained. The solution is then emulsified in a solution of 50 parts of purified acid casein, 40 parts of urea, 10 parts of thiourea, 6 parts of borax and 10 parts of triethanolamine in 160 parts of water. There are obtained 1000 parts of a viscous finely dispersed emulsion, which is stable as an adhesive or as a binding agent for pigment printing on textiles.

*Example 8*

1000 parts of a solution of a condensation product of benzoguanamine with formaldehyde and modified with n-butanol, which solution contains as solvents 15% of toluene and about 25% of butanol, are treated 4 times in the manner described in Example 1 with 2000 parts of water each time, during which the temperature of the water is slowly raised from 20° C. to 60° C. After the final decantation there are obtained 900 parts of a viscous syrup, which still contains about 17% of water in the form of finely dispersed drops.

724 parts of the product of the above extraction are emulsified in a solution of 40 parts of triethanol ammonium oleate in 236 parts of water, whereby 1000 parts of a salve-like finely dispersed emulsion are obtained, which can be used as a hardenable adhesive for paper, cardboard, leather and textiles.

*Example 9*

1000 parts of a solution in butyl alcohol of a melamine-formaldehyde condensation product etherified with n-butanol, which solution has a dry content of about 75%, are diluted with 2000 parts of heavy gasoline (boiling range 100–140° C.). The initially homogeneous clear solution begins to become turbid after the addition of more than 800 parts of heavy gasoline. There is finally obtained a strongly turbid thinly liquid solution, which separates into two layers when allowed to stand. After separating the upper solvent layer, the procedure is repeated three times with 1000 parts of heavy gasoline each time, whereby there are finally obtained as residue 520 parts of a highly viscous resinous mass, which is substantially completely free from solvent butanol.

160 parts of the lacquer resin resulting from the extraction are dissolved in a mixture of 160 parts of butyl acetate, 160 parts of decahydronaphthalene and 160 parts of dioctyl phthalate, whereby a clear thinly liquid solution is obtained. The solution is then emulsified in a solution of 45 parts of the addition product of 15 molecular proportions of ethylene oxide with 1 molecular proportion of oleyl alcohol in 315 parts of water. By homogenizing the emulsion, there are obtained 1000 parts of a stable salve-like emulsion.

This emulsion can be used as described in Example 3 by the addition of an ion-free emulsifying agent prepared as described in application Serial No. 603,164 filed August 9, 1956 by Hans U. Gassmann and emulsifying petroleum therein, for preparing a medium for textile printing.

*Example 10*

1000 parts of a solution in butyl alcohol of a melamine-formaldehyde condensation product etherified with n-butanol and insoluble in benzine hydrocarbons, the solution having a dry content of about 75%, are cautiously diluted with 600 parts of heavy gasoline (boiling range 100–140° C.). There is obtained an opalescent homogeneous solution. The latter is thoroughly agitated for a little time in a separating funnel with 2000 parts of water. After prolonged standing, the crude emulsion separates into three layers, namely 1740 parts of a lower layer consisting preponderantly of water and in which butanol and a small amount of formaldehyde are dissolved. 1280 parts of a middle layer consisting preponderantly of resin solution, which contains some benzine dissolved therein and in which 21% of water is dispersed in the form of fine drops, and 580 parts of an upper layer, which consists preponderantly of benzine having butanol dissolved therein.

The middle layer containing substantially all the melamine resin may be further extracted with benzine or water or both of these solvents together to bring about more thorough extraction of the butanol, this extraction being carried out in such manner that there is finally obtained a lacquer resin free from butanol, which lacquer resin can be converted into a stable emulsion as described in the preceding examples.

*Example 11*

The butyl alcoholic solution used in Example 3 of a melamine-formaldehyde condensation product etherified with n-butanol and insoluble in benzine hydrocarbons is passed at a speed of 8 grams per minute downwardly through a vertical tube 120 cm. long and having an internal diameter of 5 cm. Water at 80° C. is passed upwardly through the tube at a speed of 4 cm. per minute. The tube has at its lower end a discharge valve for resin and at the upper and lower ends a lateral outlet connection and inlet connection respectively, for the flowing water. About 20 cm. below the upper end of the tube the cross section of the tube is interrupted by a perforated plate, which is subjected to powerful vibration by an electromagnetic device. The lacquer resin which forms relatively coarse drops on the plate is broken up into fine particles during its passage through the perforations, and these particles flow slowly downwards in countercurrent to the upwardly flowing water, and the particles collect at the lower end of the tube and are discharged through the outlet valve.

There are obtained, for example, from 480 grams of the condensation product dissolved in butanol, which passes through the apparatus per hour, at the lower end of the apparatus 400 grams of treated resin, which contains only a very small amount of butanol and about 7% of water. In the same period about 4800 grams of water flow through the tube and leave the tube at the upper end thereof with a butanol content of about 2%. By using an apparatus of larger size the butanol can be substantially completely removed from the resin.

The resin, which has been substantially completely freed from butanol, can be worked up to a stable emulsion in a manner analogous to that of the products of the extraction described in Examples 3, 4 and 7.

*Example 12*

1000 parts of a butyl alcoholic solution, having a dry content of about 92%, of a melamine-formaldehyde condensation product highly etherified with n-butanol are stirred with 2000 parts of water at room temperature for a few minutes. The coarse emulsion so formed is allowed to separate into two layers upon standing. The upper layer of water is then poured off and the operation is repeated a total of 7 times with 2000 parts of fresh water each time. After the last decantation there are obtained about 1000 parts of a thickly liquid resin syrup, which contains about 80 parts of water in the form of more or less finely dispersed enclosed droplets. The strong odour of butanol that the resin has originally, practically disappears after the extraction process.

600 parts of the lacquer resin which has been freed from butanol by extraction with water are then emulsified in 400 parts of an aqueous solution of 25% strength of the reaction product of 2.5 parts of hexamethylene-1:6-diisocyanate with 97.5 parts of the product obtained from 1 molecular proportion of para-tertiary octyl-phenol and 100 molecular proportions of ethylene oxide.

By homogenizing the emulsion there is obtained a finely dispersed salve-like very stable preparation, which is suitable as a hardenable adhesive capable of being diluted with water or, after admixture with a dispersion of a homopolymer or copolymer, is suitable as a binding agent for pigments in dyeing textiles.

*Example 13*

100 parts of a solution in propyl alcohol of a condensation product of hexamethylol-melamine with n-propanol, the said solution being of about 90% strength, are thoroughly stirred 8 times with 200 parts of cold water for a few minutes each time, and after each extraction the upper aqueous layer is poured off after separation into layers has occurred. In this manner there is obtained a thickly liquid resin which is completely free from propanol and contains about 10% of water dispersed therein in the form of larger and smaller drops.

The resin is then emulsified in a solution in 85 parts of water of 15 parts of an ion-free emulsifying agent, obtained by the additive combination of 100 molecular proportions of ethylene oxide with 1 molecular proportion of dodecylphenol followed by reaction with 1% of 1:6-hexamethylene-diisocyanate. There are obtained 200 parts of a finely dispersed stable solvent-free emulsion, which can be used as a hardenable adhesive for paper.

What is claimed is:

1. Process for the manufacture of stable aqueous resin emulsions of the oil-in-water type, which comprises freeing substantially completely a resin lacquer comprising
   (1) a hardenable water-insoluble etherified methylol compound of a substance selected from the group consisting of urea, melamine and benzoguanamine, in which methylol compound the oxygen atom of at least one methylol group is bound to a hydrocarbon radical having from 3 to 7 carbon atoms, and
   (2) a monohydric alcohol of 3 to 7 carbon atoms which is of an at least limited miscibility with water, from said monohydric alcohol by
extraction with a liquid selected from the group consisting of water, benzine and mixtures thereof, and then emulsifying in water the extracted etherified methylol compound in the presence of an emulsifying agent.

2. Process for the manufacture of stable aqueous resin emulsions of the oil-in-water type, which comprises freeing substantially completely a resin lacquer comprising
   (1) a hardenable water-insoluble etherified methylol compound of melamine in which methylol compound the oxygen atom of at least one methylol group is bound to a hydrocarbon radical having from 3 to 7 carbon atoms, and
   (2) a monohydric alcohol of 3 to 7 carbon atoms which is of an at least limited miscibility with water, from said monohydric alcohol by
extraction with water, and then emulsifying in water the extracted etherified methylol compound in the presence of an emulsifying agent.

3. Process for the manufacture of stable aqueous resin emulsions of the oil-in-water type, which comprises freeing substantially completely a resin lacquer comprising
   (1) a hardenable water-insoluble etherified methylol compound of urea in which methylol compound the oxygen atom of at least one methylol group is bound to a hydrocarbon radical having from 3 to 7 carbon atoms, and
   (2) a monohydric alcohol of 3 to 7 carbon atoms which is of an at least limited miscibility with water, from said monohydric alcohol by
extraction with water, and then emulsifying in water the extracted etherified methylol compound in the presence of an emulsifying agent.

4. Process for the manufacture of stable aqueous resin emulsions of the oil-in-water type, which comprises freeing substantially completely a resin lacquer comprising
   (1) a hardenable water-insoluble etherified methylol compound of melamine in which methylol compound the oxygen atom of at least one methylol group is bound to a hydrocarbon radical having from 3 to 7 carbon atoms, and
   (2) a monohydric alcohol of 3 to 7 carbon atoms which is of an at least limited miscibility with water, from said monohydric alcohol by extraction with water, and then emulsifying
in water the extracted etherified methylol compound in the presence of an emulsifying agent which is an ethylene oxide condensation product of a water-insoluble organic compound of the formula R—OH wherein R represents a hydrocarbon radical having from 8 to 24 carbon atoms.

5. Process for the manufacture of stable aqueous resin emulsions of the oil-in-water type, which comprises freeing substantially completely a resin lacquer comprising
   (1) a hardenable water-insoluble etherified methylol compound of urea in which methylol compound the oxygen atom of at least one methylol group is bound to a hydrocarbon radical having from 3 to 7 carbon atoms, and
   (2) a monohydric alcohol of 3 to 7 carbon atoms which is of an at least limited miscibility with water, from said monohydric alcohol by
extraction with water and then emulsifying in water the extracted etherified methylol compound in the presence of an emulsifying agent which is an ethylene oxide condensation product of a water-insoluble organic compound of the formula R—OH wherein R represents a hydrocarbon radical having from 8 to 24 carbon atoms.

6. Process for the manufacture of stable aqueous resin emulsions of the oil-in-water type, which comprises freeing substantially completely a resin lacquer comprising
   (1) a hardenable water-insoluble etherified methylol compound of melamine in which methylol compound the oxygen atom of at least one methylol group is bound to a hydrocarbon radical having from 3 to 7 carbon atoms, and
   (2) a monohydric alcohol of 3 to 7 carbon atoms which is of an at least limited miscibility with water, from said monohydric alcohol by
extraction with water, and then emulsifying in water the extracted etherified methylol compound in the presence of an emulsifying agent which is a reaction product of a polyisocyanate with a condensation product of ethylene oxide with a compound of the formula R—OH wherein R represents a hydrocarbon radical having from 8 to 24 carbon atoms.

7. Process for the manufacture of stable aqueous resin emulsions of the oil-in-water type, which comprises freeing substantially completely a resin lacquer comprising
   (1) a hardenable water-insoluble etherified methylol compound of urea in which methylol compound the oxygen atom of at least one methylol group is bound to a hydrocarbon radical having from 3 to 7 carbon atoms, and
   (2) a monohydric alcohol of 3 to 7 carbon atoms which is of an at least limited miscibility with water, from said monohydric alcohol by
extraction with water, and then emulsifying in water the extracted etherified methylol compound in the presence of an emulsifying agent which is a reaction product of a polyisocyanate with a condensation product of ethylene oxide with a compound of the formula R—OH wherein R represents a hydrocarbon radical having from 8 to 24 carbon atoms.

8. Process for the manufacture of stable aqueous resin emulsions of the oil-in-water type, which comprises freeing substantially completely a resin lacquer comprising
   (1) a hardenable water-insoluble etherified methylol compound of melamine in which methylol compound the oxygen atom of at least one methylol group is bound to a hydrocarbon radical having from 3 to 7 carbon atoms,
   (2) a monohydric alcohol of 3 to 7 carbon atoms which is of an at least limited miscibility with water and
   (3) a water-insoluble organic solvent, from said monohydric alcohol by extraction with water, and then emulsifying in water the resulting
solution of the extracted etherified methylol compound in the presence of an emulsifying agent which is a reaction product of a polyisocyanate with a condensation product of ethylene oxide with a compound of the formula R—OH wherein R represents a hydrocarbon radical having from 8 to 24 carbon atoms.

9. Process for the manufacture of stable aqueous resin emulsions of the oil-in-water type, which comprises freeing substantially completely a resin lacquer comprising
(1) a hardenable water-insoluble etherified methylol compound of melamine in which methylol compound the oxygen atom of at least one methylol group is bound to a hydrocarbon radical having from 3 to 7 carbon atoms, and
(2) a monohydric alcohol of 3 to 7 carbon atoms which is of an at least limited miscibility with water, from said monohydric alcohol by
extraction with water, adding a water-insoluble organic solvent to the extracted etherified methylol compound of melamine, and emulsifying in water the resulting solution in the presence of an emulsifying agent which is a reaction product of a polyisocyanate with a condensation product of ethylene oxide with a compound of the formula R—OH wherein R represents a hydrocarbon radical having from 8 to 24 carbon atoms.

10. Process for the manufacture of stable aqueous resin emulsions of the oil-in-water type, which comprises freeing substantially completely a resin lacquer comprising
(1) a hardenable water-insoluble etherified methylol compound of urea in which methylol compound the oxygen atom of a least one methylol group is bound to a hydrocarbon radical having from 3 to 7 carbon atoms, and
(2) a monohydric alcohol of 3 to 7 carbon atoms which is of an at least limited miscibility with water, from said monohydric alcohol by
extraction with water, adding a water-insoluble organic solvent to the extracted etherified methylol compound of urea, and emulsifying in water the resulting solution in the presence of an emulsifying agent which is an ethylene oxide condensation product of a water-insoluble organic compound having at least one reactive hydrogen atom.

11. Process for the manufacture of a stable aqueous resin emulsion of the oil-in-water type which comprises freeing substantially completely a resin lacquer comprising an n-butyl alcoholic solution of a melamine-formaldehyde condensation product highly etherified with n-butanol, from n-butanol by extraction with water and then emulsifying the said extracted etherified melamine-formaldehyde condensation product in water in the presence of an emulsifying agent which is the reaction product of 2.5 parts by weight of hexamethylene-1:6-diisocyanate with 97.5 parts by weight of the product obtained from 1 mol. of p-tertiary octyl-phenol and 100 mols. of ethylene oxide.

12. Process for the manufacture of a stable aqueous resin emulsion of the oil-in-water type which comprises freeing substantially completely a resin lacquer comprising
(1) a melamine-formaldehyde condensation product etherified with n-butanol,
(2) n-butanol and
(3) dioctyl-phthalate,
from n-butanol by extraction with water, and then emulsifying in water the resulting solution of the said etherified melamine-formaldehyde condensation product in the presence of an emulsifying agent which has been obtained by the additive combination of 200 mols. of ethylene oxide with one mol. of hydroabietyl alcohol followed by reaction of the addition product with 1% of hexamethylene-1:6-diisocyanate.

13. Process for the manufacture of a stable aqueous resin emulsion of the oil-in-water type which comprises freeing substantially completely a resin lacquer comprising
(1) a melamine-formaldehyde condensation product etherified with n-butanol and
(2) n-butanol,
from the said alcohol by extraction with water, adding dioctyl phthalate to the extracted melamine-formaldehyde condensation product etherified with n-butanol, and then emulsifying in water the resulting solution in the presence of an emulsifying agent which has been obtained by the additive combination of 200 mols. of ethylene oxide with one mol. of hydroabietyl alcohol followed by reaction of the addition product with 1% of hexamethylene-1:6-diisocyanate.

References Cited in the file of this patent
UNITED STATES PATENTS

| | | |
|---|---|---|
| 2,586,098 | Schibler | Feb. 19, 1952 |
| 2,680,101 | Schibler et al. | June 1, 1954 |
| 2,852,479 | Bender et al. | Sept. 16, 1958 |

OTHER REFERENCES

"Modern Plastics Encyclopedia" (1959) volume 36, page 646.

Perry: "Chemical Engineer's Handbook," 3rd edition, McGraw-Hill Publishing Company, New York (1950) page 715.

"Modern Plastics Encyclopedia and Engineer's Handbook," Plastics Catalogue Corp., New York (1952), pages 702–703.